United States Patent
Prasad et al.

(10) Patent No.: US 8,656,026 B1
(45) Date of Patent: Feb. 18, 2014

(54) ASSOCIATING NETWORK ADDRESS LEASE INFORMATION WITH USER DATA

(75) Inventors: Ranjan Prasad, Fremont, CA (US); Joshua Littlefield, Wellesley, MA (US); Thomas Parker, Boulder Creek, CA (US); David Bainbridge, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 2607 days.

(21) Appl. No.: 10/838,441

(22) Filed: May 3, 2004

(51) Int. Cl.
*G06F 15/16* (2006.01)
*H04L 29/08* (2006.01)

(52) U.S. Cl.
CPC .............................. *H04L 29/08576* (2013.01)
USPC ........... 709/227; 709/217; 709/218; 709/219; 709/220; 709/221; 709/222; 709/223; 709/224; 709/225; 709/226; 709/228; 709/229; 709/238; 709/245

(58) Field of Classification Search
USPC ......... 709/217, 218, 219, 220, 221, 222, 223, 709/224, 225, 226, 227, 228, 229, 238, 245
See application file for complete search history.

(56) References Cited

U.S. PATENT DOCUMENTS

| | | | | |
|---|---|---|---|---|
| 5,884,024 A * | 3/1999 | Lim et al. | | 726/3 |
| 6,195,706 B1 * | 2/2001 | Scott | | 709/245 |
| 6,243,749 B1 * | 6/2001 | Sitaraman et al. | | 709/223 |
| 6,317,786 B1 * | 11/2001 | Yamane et al. | | 709/224 |
| 6,515,974 B1 * | 2/2003 | Inoue et al. | | 370/331 |
| 6,578,074 B1 * | 6/2003 | Bahlmann | | 709/220 |
| 6,778,528 B1 * | 8/2004 | Blair et al. | | 370/352 |
| 6,801,941 B1 * | 10/2004 | Stephens et al. | | 709/225 |
| 6,862,286 B1 * | 3/2005 | Tams et al. | | 370/401 |
| 6,912,534 B2 * | 6/2005 | DeBettencourt et al. | | 707/10 |
| 6,928,282 B2 * | 8/2005 | Taniguchi | | 455/433 |
| 6,952,428 B1 * | 10/2005 | Necka et al. | | 370/466 |
| 7,096,257 B2 * | 8/2006 | Trisno et al. | | 709/220 |
| 7,107,326 B1 * | 9/2006 | Fijolek et al. | | 709/220 |
| 7,185,079 B1 * | 2/2007 | Bainbridge et al. | | 709/223 |
| 7,213,061 B1 * | 5/2007 | Hite et al | | 709/223 |
| 7,221,666 B2 * | 5/2007 | Inoue et al. | | 370/338 |
| 7,222,359 B2 * | 5/2007 | Freund et al. | | 726/3 |
| 2002/0016858 A1 * | 2/2002 | Sawada et al. | | 709/238 |
| 2002/0042823 A1 * | 4/2002 | DeBettencourt et al. | | 709/224 |
| 2002/0124066 A1 * | 9/2002 | Chang et al. | | 709/223 |
| 2002/0143968 A1 * | 10/2002 | Banerjee et al. | | 709/230 |
| 2002/0191576 A1 * | 12/2002 | Inoue et al. | | 370/338 |

(Continued)

OTHER PUBLICATIONS

Cisco Systems, Inc., "DHCP Address Allocation Using Option 82,", http://www.cisco.com/univercd/cc/td/doc/product/software/ios122/122newft/122limit/122z, data retrieved Sep. 23, 2004, pp. 1-20.

(Continued)

*Primary Examiner* — Saket K Daftuar
(74) *Attorney, Agent, or Firm* — Hickman Palermo Truong Becker Bingham Wong LLP (57) ABSTRACT

A method and apparatus for tracking an identity of a user associated with a network lease is disclosed. The IP lease is correlated to user information by storing a user ID with lease information in a manner in which the user information is associated with the lease information. In an embodiment, the user ID is a Global User ID (GUID). In an embodiment the user ID is unique to a specified domain. In an embodiment, the user ID is given to only one user and never changes.

45 Claims, 6 Drawing Sheets

(56) References Cited

U.S. PATENT DOCUMENTS

| | | | |
|---|---|---|---|
| 2003/0101243 A1* | 5/2003 | Donahue et al. | 709/220 |
| 2003/0120822 A1* | 6/2003 | Langrind et al. | 709/251 |
| 2003/0126262 A1* | 7/2003 | Yoshida et al. | 709/226 |
| 2003/0133450 A1* | 7/2003 | Baum | 370/389 |
| 2003/0145073 A1* | 7/2003 | Lee | 709/223 |
| 2003/0225864 A1* | 12/2003 | Gardiner et al. | 709/220 |
| 2004/0177136 A1* | 9/2004 | Chen et al. | 709/223 |
| 2004/0202466 A1* | 10/2004 | Koch et al. | 398/1 |
| 2004/0261116 A1* | 12/2004 | Mckeown et al. | 725/109 |
| 2005/0078681 A1* | 4/2005 | Sanuki et al. | 370/395.5 |
| 2005/0262218 A1* | 11/2005 | Cox et al. | 709/217 |

OTHER PUBLICATIONS

Cisco Systems, Inc., "Configuring the DHCP Option 82 for Subscriber Indentification," http://www.cisco.com/univercd/cc/td/doc/product/lan/c3550/1219eal/3550scg/swdhcp82.h, data retrieved Sep. 23, 2004, pp. 1-8.

* cited by examiner

ASSOCIATING NETWORK ADDRESS LEASE INFORMATION WITH USER DATA

FIELD OF THE INVENTION

The invention is related to the field of dynamic network address assignment servers in general. More specifically, the invention is related to network address leases.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Similarly, the problems with the various approaches are not necessarily recognized in the prior art.

A Globally Unique Identifier (GUID) refers to a unique number that is produced by the operating system (e.g., Microsoft Windows®) or by any other utility to identify a particular component, application, file, database entry, and/or user. For instance, a Website may generate a GUID and assign it to a user's browser to record and track the session. A GUID is also used in a Windows registry to identify Communication Dynamic Link Libraries (COMM DLLs). Knowing where to look in the registry and having the correct GUID yields information about a COM object (i.e., information in the type library, its physical location, etc.). Windows also identifies user accounts by a username (computer/domain and username) and assigns it a GUID. Some database administrators use GUIDs as primary key values in databases. In this specification, a GUID is a unique identifier for an object, such as a user object. A GUID is collision free, meaning that the same GUID is never assigned to two different users.

GUIDs can be created in a number of ways, but usually they are a combination of one or more unique values based on a specific point in time (e.g., an Internet Protocol (IP) address, network Media Access Control (MAC) address, clock date/time, etc.) (Webopedia.com). In a network, GUIDs may be used at the business layer for keeping track of billing information, for example, and associating the billing information with a user.

Dynamic Host Configuration Protocol (DHCP) refers to a protocol for assigning dynamic IP addresses to devices on a network. With dynamic addressing, a device can have a different IP address every time it connects to the network. In some systems, the device's IP address can even change while it is still connected. DHCP also supports a mixture of static and dynamic IP addresses. Dynamic addressing simplifies network administration because the software keeps track of IP addresses rather than requiring an administrator to manage the task. Using DHCP and dynamic addressing, a new computer can be added to a network without manually assigning it a unique IP address. Many Internet Service Providers (ISPs) use dynamic IP addressing for users, such as dial-up, DSL, cable, Ethernet, and enterprise users.

A DHCP server may be an active service agent, and may lease an IP address for a fixed amount of time. Before the time of the lease expires, if an end station device associated with a user anticipates that the connection to the network will still be needed, the end station applies to renew the lease on behalf of the user. In response, the DHCP renews the IP lease or issues the user a new lease for a new IP address.

In certain jurisdictions, laws or administrative regulations require any network operator to be capable of determining which user had a specific IP address assigned to him or her during a specified period of time. These requirements exist, for example, to enable law enforcement agencies to locate particular users or associate particular users with unlawful activity.

However, in networks that use dynamic network addressing, associating an IP lease with a particular user at a particular time can be a very complex process. Any software that performs this association needs to gather information from multiple sources and application systems and perform a correlation. Current systems or network operators, for instance, perform the following steps when associating a specific IP address to a user during a given a time period.

In a first step, a Dynamic Host Control Protocol (DHCP) server, such as Cisco Network Registrar (CNR), is queried to determine the MAC address or switch port, associated with the IP address in question, from which the user accessed the network.

In a second step, if the Operational Support Systems and/or Business Support Systems (OSS/BSS) do not track the active and historical MAC addresses or the switch ports for each user, then an inventory system is used to assemble the active and historical MAC addresses or switch ports used by the users of interest. Specifically, the inventory is used to determine MAC addresses or switch ports associated with the locations where the network was accessed, or otherwise retrieve an identifier for the user. The inventory system determines the location where the network was accessed by looking up the MAC Address and/or switch port values in the inventory system and retrieving a corresponding user record or other user identification, such as a postal address. Using the inventory to determine the location where the user accessed the network may be skipped if the OSS/BSS track the MAC address or switch port for both active and historical users.

However, a difficulty with the above two steps is that the MAC address is associated with a device, and if a different person uses the same device the MAC address will not change, and there may be no indication that the user has changed. Similarly, although the switch port is associated with a location, the person using the switch port may change. For example, a person may move to another apartment, and there may be no indication that the former user of the switch port associated with the apartment is no longer present. If the user uses a mobile device to access a network, the switch port changes relatively frequently, thereby complicating correlating the user to a given switch port at any given time.

In a third step, using the active and/or historical data gathered from the inventory in the second step or tracked by the OSS/BSS, the active and/or historical user data is queried to correlate the MAC address or switch port to a user for a given time period. The association of MAC address and/or switch port with a user is not invariant. This association may change over time. Specifically, over a sufficient amount of time the same MAC address and/or switch port may be used by many different users to access the network. Therefore, one cannot rely on a static switch port to user mapping that an inventory system may maintain for establishing an association between an IP lease and a user. The changing nature of the association negatively impacts the likelihood of performing an accurate and successful correlation between a user and a historical IP address.

As an example of the above method, assume that the OSS/BSS do not track the switch port for both active and historical users, and therefore the second step may not be skipped. Then, in one manner of correlating a user with an IP address, an inventory system is used to determine the postal address of the user's location. Subsequent to determining the postal address, an active or historical user database determines the specific user that registered from that postal address. In other words, first the IP lease information is queried for the MAC address and/or the switch port. Then an OSS/BSS system is queried to determine which user is associated with that MAC address or switch port.

Additionally, associating a user with an IP address using the above approach requires searching information about the usage of the IP address. Based on the usage of the IP address it may be necessary to infer which users used which addresses, which may fail. Specifically, the information may be insufficient to conclusively determine which user used an IP address at a particular time. For example, although when leasing an IP address the time of the lease of the IP address may be recorded, there may be subsequent periods of time before the expiration of the lease when the IP address is in use by another user that is not recorded. Consequently, if a search of active data does not provide a enough information to determine which user used a particular IP address at a given time, then archived data must be searched as well, which may still be insufficient to conclusively determine the user of the IP address at a particular time. Further, multiple information sources must be consulted, which increases complexity and the time required to resolve an association.

The above approach is further complicated, because the details of the network and network layer may be different for different networks. Additionally, in the above approach, the business layer and/or service layer is required to account for the details of the network and the network layer. Thus, it can be cumbersome to write business layer and/or service layer software that will accommodate the specific details of any given network and network layer, and it may be necessary to customize the business layer and/or the service layer for certain networks.

As an example of one of the sources of complexities in correlating IP lease information to user information, DHCP provides a framework for passing configuration information to hosts on a TCP/IP network, in a request/response transaction. Configuration parameters and other control information are carried in tagged data items of the DHCP message, called options. A DHCP relay agent may operate in an access switch (a switch for accessing the network). The DHCP Relay Agent Information Option (option 82), allows a DHCP relay agent to add information known by that agent to the host's requests for examination by the DHCP server. An access switch supporting option 82 typically adds port-identifying information to the request. The DHCP server or associated software can record option 82 information, and return the option 82 information when lease information is queried. In the Cisco Subscriber Management Center (SMC) Ethernet To The Home (ETTH) environment, lease query and association steps are significantly different if a user terminates usage at a switch that supports option 82 versus another user that terminates usage at a switch that does not support option 82. The applications keep track of such network differences and the semantic differences in IP lease query processing.

The above approach for associating a user with an IP lease gets even more complex for mobile users, because mobile users may use different switch ports to access the network. In addition, the burden is placed on the OSS/BSS and inventory systems to track information for each user for the express purpose of performing an IP lease query. This process of correlating users with IP addresses is not only error prone, but also inefficient.

Authentication of a user does not necessarily solve the problem of associating a user with an IP lease, because the user may change locations after authenticating, thereby changing switch ports. Consequently, identifying a user by associating the user with the switch port at which the user authenticated will indicate the user that authenticated, who may no longer be using that switch port.

Thus, there is a need for a simplified method of associating network address leases with users.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for associating network address lease information with a user is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
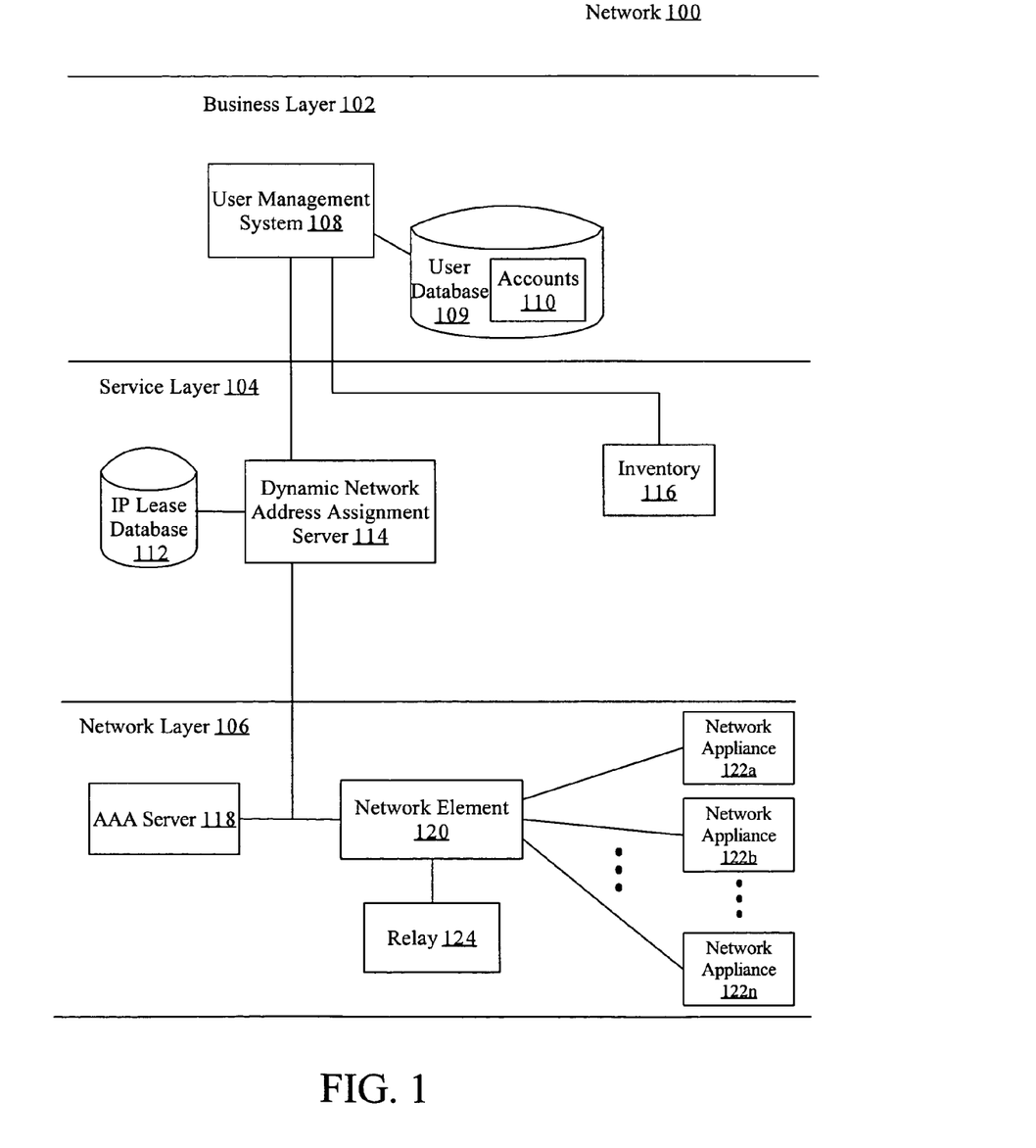
FIG. 1 is block diagram of an embodiment of a network in which IP lease data is associated with a user.
Figure 2:
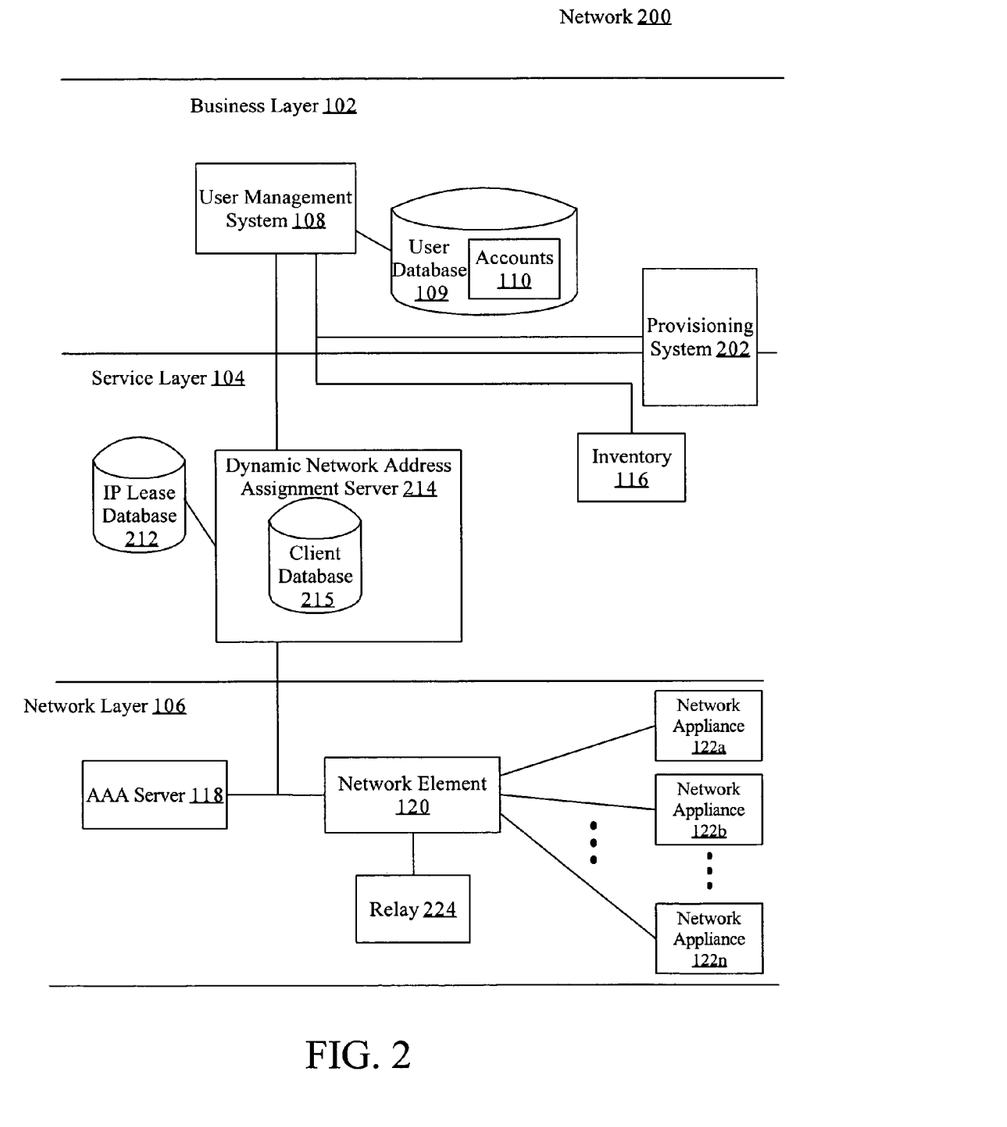
FIG. 2 is block diagram of another embodiment of a network in which IP lease data is associated with a user.
Figure 3:
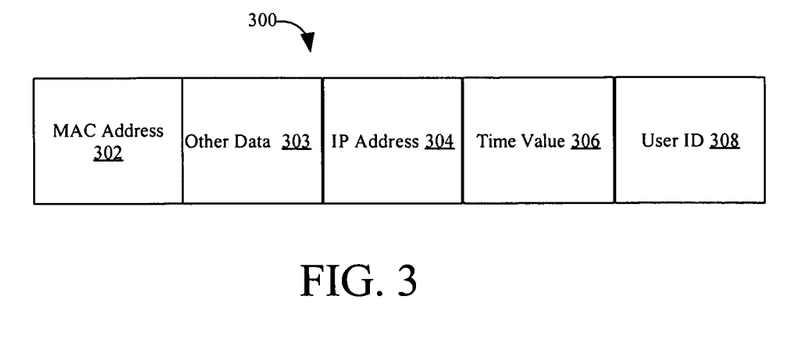
FIG. 3 is a block diagram of an embodiment of a correlated lease record.

Embodiments are described herein according to the following outline:
1.0 General Overview
2.0 Structural and Functional Overview
3.0 Associating Network Address Lease Information With a User
   3.1 Embodiments of Enhanced Networks
   3.2 A Correlated Lease Record
   3.3 A Method for Correlating the IP Lease Data
   3.4 A Method for Querying The Lease Information
   3.5 Examples
4.0 Implementation Mechanisms—Hardware Overview
5.0 Extensions and Alternatives In general in this specification, for each of FIG. 1, FIG. 2, and FIG. 3, first a brief description of each numbered feature of the figure is given. In the brief description of each numbered feature, the name of each numbered feature is given. After the brief description of each numbered feature, a more detailed description of each numbered feature, and a description of how each of the features cooperate together, are provided. Each of the figures and features are generally discussed in the order in which they are numbered. Although headings are provided, information related to a particular heading, but not found in the section having that heading, may also be found elsewhere in the specification.

1.0 GENERAL OVERVIEW

The needs identified in the foregoing Background, and other needs and objects that will become apparent in the following description, are achieved in the present invention, which comprises, in one aspect, a method and apparatus for associating network address lease information with user data. Certain embodiments provide features that can be used independently of one another or with any combination of the other features. Although many features are motivated by the problems explained above, the embodiments need not address any or all of the problems discussed above.

In an embodiment of the invention, a user Identification (ID) value (such as a GUID) is stored with the network address lease information at the network layer. GUIDs are globally unique, and collisions between different GUIDs therefore are unlikely. For example, in a DHCP implementation in an IP network, an IP lease record stores and associates a MAC address, IP address, time value (which may be a time period, and may include a start time and an end time), and GUID value. The IP lease record may also store other data such as option 82 data (if available). In an embodiment, rather than trying to reconstruct the history of which user had which IP lease or of which IP lease was used by which user, the information is recorded as it occurs.

In this specification, anywhere that the word user appears, the word subscriber may be substituted, as an example. However, an embodiment does not require a subscriber-service provider relationship. In this specification, anywhere that the term user ID appears, the term subscriber ID may be substituted, as an example. Anywhere either the term user ID or subscriber ID appears the term GUID may be substituted to obtain a specific example. However, unique identifier values other than GUID values may be used in other embodiments. In the above paragraph and in the remainder of this specification although an IP lease, IP address, and IP network are referenced, the IP lease, IP address, and IP network are just examples of a network address lease, network address, and network, respectively. The terms network address lease, network address, and network may be substituted for the terms IP lease, IP address, and IP network, respectively, to obtain a broader description of the aspects being described.

2.0 STRUCTURAL AND FUNCTIONAL OVERVIEW

According to an embodiment, unique user identifying information is recorded in association with IP lease information as IP leases are granted. The resulting IP lease information may be accessed (e.g., stored and/or retrieved) from network elements logically located in the service layer of a network. As a result, rather than trying to indirectly reconstruct the history of which user had which IP lease or of which IP lease was used by which user, by querying information from multiple tables and performing a correlation, user identifying information is available directly from an IP lease record.

In an embodiment, a unique identifier that represents a user is associated with an IF lease record. In an embodiment, the unique identifier may uniquely identify the user over a given domain, such as in the OSS/BSS systems. In other embodiments, the unique identifier may uniquely identify the user over a network, multiple domains, or the entire Internet, for example.

In an embodiment, the user ID information (which may include the unique identifier) may be stored with the IP lease information. The user ID information may be stored in a location other than in the lease record in addition to or instead of storing the user ID in the lease record. For example, user ID information may be written to an address assignment log maintained by the dynamic address assignment server along with IP lease and time information, so that the user ID is associated with having a particular IP lease at a particular time.

In an embodiment, at the time an IF address is assigned by a dynamic network assignment server (e.g., a DHCP server), user ID information (which may include the unique identifier) is obtained from the user end station. In an alternative embodiment, the user ID information is obtained after the IP lease is granted, and then when the user ID information is obtained, the IP lease is updated with either the user ID information or an indication of where to find the user ID information.

Once a database at the service level is created including IP lease information in which each IP lease is associated with a user ID (which may be referred to as correlated IP lease information), an IP lease query process is greatly simplified. No correlation of multiple information sources is needed. In an embodiment, the correlated IP lease information may be used to provide a simple association between a key network attribute and the users of that network. In an embodiment, the correlated IP lease information may be used as a primary means of associating information that is spread between OSS/BSS systems and network services, such as DHCP servers. In an embodiment, the correlated IP lease information may allow for easy and reliable integration of OSS/BSS systems with network services, such as DHCP servers. In an embodiment, applications can use the correlated IP lease information, so that the applications no longer need to be aware of network specific details and track such network specific details for each user.

Although the user ID may be stored in association with the IP lease at the time of the IP lease assignment, the invention is not limited to storing the user ID only during an IP lease assignment. Specifically, the user ID can be associated with an IP lease at any point in time. Additionally, the user ID can be associated with an IP lease by modules and/or software components other than a DHCP server or another IP lease assignment system.

Storing the user ID in association with an IP lease record provides an easier, more conclusive, and less error prone method of associating IP leases with users. Storing the user ID in a manner that each IP lease is associated with a user eliminates the need to perform multiple searches and matching of data in order to perform a correlation of the user IDs with the IP lease. As ancillary benefits, associating the user with a unique user ID facilitates allowing the user to configure and care for the services that are available to the user without assistance and on their own. Additionally, associating the user with a unique user ID facilitates allowing a user to login from different locations and/or to use different network appliances and still be recognized as the same user and obtain the same services.

3.0 ASSOCIATING NETWORK ADDRESS LEASE INFORMATION WITH A USER

3.1 Embodiments of a Network in which IP Lease Data is Associated with a User FIG. 1 shows a block diagram of a network 100 in which network address lease data is associated with a user. Network 100 includes a business layer 102, service layer 104, and network layer 106. The business layer 102, service layer 104, and network layer 106 are logical divisions of network 100 that comprise one or more network elements and contain one or more network services. Within business layer 102 are User Management System (UMS) 108 and user database 109 having accounts 110. Within service layer 104 are lease database 112, dynamic network address assignment server 114, and inventory 116. Optionally, within network layer 106 is Authentication Authorization and Accounting (AAA) server 118. Also, within network layer 106 are network element 120, network appliances 122a, 122b, . . . 122n, and relay 124. Individual end users are typically associated with network appliances 122a, 122b, . . . 122n. In alternative embodiment, network 100 may not have all of the components listed above or may have other components instead of or in addition to those listed above.

Network 100 may be any collection of computers, printers, routers, switches, and other devices that can communicate with each other over some transmission medium. Additionally, in network 100 IP leases are stored in a manner such that each IP lease may be readily associated with the user. A manner in which network 100 may store IP leases in association with users, via a user ID, is described below, in conjunction with the components of network 100, for example.

Business layer 102 keeps track of users, user usage, services provided to various users, accounting information, and billing information, for example. Service layer 104 provides services to different users. For example, services layer 104 provides IP addresses to users.

Network layer 106 provides connectivity and path selection between two end systems. Network layer 106 is the layer at which packet routing occurs. Additionally, in an embodiment, network layer 106 correlates IP leases with users. Optionally, there may be other layers, such as an operations layer between business layer 102 and service layer 104.

User management system 108 may comprise one or more tools within one or more managing devices that are connected to network 100. User management system 108 may facilitate creating and storing an inventory of hardware and software on the network. User management system 108 may include information associating users with locations, ports, and/or MAC addresses during a given time period. A subscriber management system (SMS) is an example of user management system 108.

User database 109 may store user IDs, names, addresses and/or other identifying information, and optionally may store ports and/or MAC addresses associated with the user for service provisioning. Although the switch port or MAC address may be stored in user database 109, the switch port and MAC address are not necessary for performing IP lease correlation. For example, the MAC address and switch port may be stored for service provisioning as opposed to for identifying a user, which is error prone because the MAC address and switch port may change. By associating the user with a user ID, there is no need to rely on the MAC address or switch port for identifying a user, and therefore the MAC address and switch port do not need to be stored in user database 109. In an embodiment, the user database 109 may be an external user database, such as a Lightweight Directory Access Protocol (LDAP) directory, in which the user ID is stored. User database 109 may include active and archived user information.

Accounts 110 includes user usage information, billing information, costs of services, and fees charged, for example. Accounts 110 may include both archived and active user information. Optionally, accounts 110 may store the information associating the users with locations, ports, and/or MAC address for the purpose of calculating bills or other account related activities. Accounts 110 may be included within user database 109.

Lease database 112 includes IP lease data, such as one or more records that store and associate an IP address that has been leased, an end station identifier such as a MAC address, timestamp information, and the user ID of the user that leased the IP address. In an alternative embodiment, information about where and/or how to find the user ID, such as a reference to another table or database may be stored in lease database 112 instead of actually storing the user ID. Lease database 112 may also store information, such as option 82 information and/or switch port information. Lease database 112 may include both archived and active IP lease information. Lease data stored in lease database 112 may include a cable-modem MAC address, a Virtual Port Identifier (VPI), a Virtual Circuit Identifier (VCI), and/or a per-user Virtual Local Area Network (VLAN) identifier, for example. Lease database 112 may include archived IP lease records, and may include historical lease information. Alternatively, the historical and/or archived IP lease information may be maintained elsewhere.

Dynamic network address assignment server 114 dynamically assigns IP addresses to network appliances 122a, 122b, . . . 122n in response to requests from the network appliances. For example, dynamic network address assignment server 114 may be a DHCP server as described in RFC 2131 and/or RFC 3315 or that implements RFC 2131 and/or RFC 3315. Dynamic network address assignment server 114 may include a policy for assigning IP leases and a list of available IP addresses. Dynamic network address assignment server 114 may store and correlate MAC addresses of network appliances 122a, 122b, . . . 122n and IP addresses that are assigned. For example, if the dynamic address assignment server 114 is a DHCP server, switch port information for network element 120 may be obtained and stored as option 82 information. Dynamic network address assignment server 114 may also store switch port information for ports of network element 120 through which the network appliances 122a, 122b, . . . 122n access the network. Dynamic network address assignment server 114 may lease IP addresses for a fixed amount of time, and maintain lease database 112 by storing IP lease data in manner so that the IP leases are correlated with user IDs. In an embodiment, dynamic address assignment server 114 may correlate switch port information with MAC addresses and/or IP addresses and store the correlation in IP lease records.

Dynamic address assignment server 114 may publish an event every time a lease is granted and every time a lease expires. Dynamic address assignment server 114 may include facilities for obtaining client information from external directories. As an example of an alternative embodiment, user ID data may be stored in and/or obtained from a Lightweight Directory Access Protocol (LDAP) directory instead of or in addition to lease database 112. Dynamic address assignment server 114 may obtain the user ID data from the LDAP directory. In an embodiment, lease database 112 is part of dynamic address assignment server 114. Dynamic address assignment server 114 may periodically archive IP lease records in lease database 112. Dynamic address assignment server 114 may store historical lease information in lease database 112 or elsewhere. Alternatively, another device may store the historical and/or archived lease information.

Inventory 116 includes an inventory of network elements present in network 100 and services available in network 100.

Optionally, authentication, authorization, and accounting (AAA) server 118 controls access by users to computer resources by authenticating the users, determining which resources the users are authorized to access, and storing accounting information about accesses. AAA server 118 is optional, and not necessary for associating network address lease information with user data. Thus, AAA server 118 may authenticate users or network appliances 122a, 122b, . . . 122n of network 100. For example, AAA server 118 may authenticate a user, based on a username and password. As part of the authentication process, AAA server 118 may make a decision as to whether to grant or deny a user access to one or more network resources of network 100, depending on the user's authorization level, for example. The decision made by AAA server 118 is enforced by a switch or other concentrator to which the user is connected. Such network resources may include user management system 108 or other resources in business layer 102, for example. AAA server 118 authenticates and (optionally) indicates an access level, which a network element such as a switch then enforces. AAA server 118 may be a Remote Authentication Dial-In User Service (RADIUS) server that communicates with network element 120 using RADIUS protocol, for example.

Network element 120 may be any network infrastructure element used to communicatively connect computers, direct or carry network traffic, and/or otherwise form a network. Network element 120 may be a switch, a router, or a bridge, for example. Additionally, network element 120 may enforce the access decision of AAA server 118.

Network appliances 122a, 122b, . . . 122n are appliances that allow a user to access resources (e.g., services) of network 100. Network appliances 122a, 122b, . . . 122n may be any combination of personal computers, workstations, digital cellular phones, IP phones, personal digital assistants, electronic books, or other appliances.

Relay 124 is associated with dynamic network address assignment server 114. For example, dynamic network address assignment server 114 may be a DHCP server, and relay 124 may be a DHCP relay. Relay 124 relays packets from dynamic network address assignment server 114 to network appliances 122a, 122b, . . . 122n, and from network appliances 122a, 122b, . . . 122n to dynamic network server 114. Relay 124 allows network appliances 122a, 122b, . . . 122n and dynamic network assignment server 114 to be located on different subnets. Relay 124 is a relay agent for dynamic address assignment server 114. Relay 124 is used on a subnet with clients of dynamic address assignment server 114 (e.g., network appliances 122a, 122b, . . . 122n) to "relay" requests and/or other messages from network appliances 122a, 122b, . . . 122n to dynamic address assignment server 114 and from dynamic address assignment server 114 to network appliances 122a, 122b, . . . 122n. In an embodiment, since packets of dynamic address assignment server 114 can be link-layer broadcast with no source IP address, the packets will not be routed off of the local subnet. Relay 124 unicasts or broadcasts the packets to another subnet for network appliances 122a, 122b, . . . 122n. Relay 124 may be embedded within network element 120 or may be separate from network element 120.

FIG. 2 is block diagram of network 200, which is another embodiment of a network in which IP lease data is associated with a user. Network 200 includes the same components as network 100 except network 200 additionally includes provisioning system 202. Also, network 200 includes lease database 212, dynamic network address assignment server 214, client database 215, and relay 224 instead of the corresponding components of network 100.

Network 200 differs from network 100 in that network 200 includes provisioning system 202, and network 200 supports the usage of option 82 information in lease database 212, dynamic network address assignment server 214, and relay 224. However, in alternative embodiment, option 82 capabilities may be included in network 200 without provisioning system 202, and provisioning system 202 may be included in an embodiment of network 200 that does not have option 82 capabilities.

Provisioning system 202 allocates services or resources to users. For example, provisioning system 202 may be used to establish packet voice service for a particular user or network appliance 122a, 122b, . . . 122n. Provisioning system 202 may have some portions located in service layer 104 and other portions located in business layer 102, and/or may have any or all of its portions located in a separate operational layer that is between the business layer 102 and service layer 104. Dynamic network address assignment server 114 may include an extension for interfacing with provisioning system 202. Using the extension, dynamic network address assignment server 214 may either obtain user identifiers from and/or provide user identifiers to provisioning system 202.

In an embodiment, lease database 212 is the same as lease database 112, except lease database 212 may store option 82 information. In other words, the only difference between lease database 212 and lease database 112 may be the content of the data stored in lease database 212 and lease database 112.

In an embodiment, dynamic network address assignment server 214 is the same as dynamic network address assignment server 114 except dynamic network address assignment server 214 handles option 82 information and includes client database 215. The use of option 82 is unrelated to client database 215. In an embodiment, dynamic address assignment server 214 does not include client database 215, but can handle option 82 information. In an embodiment, dynamic address assignment server 214 has client database 215, but does not handle option 82 information.

Optionally, client database 215 may be embedded within dynamic network address assignment server 214. Client database 215 may be indexed by MAC address, switch port, or any other unique characteristic of the entity requesting the IP address. Client database 215 may include configuration information that indicates a type of IP address or a type of configuration information to give a particular user. Client database 215 may temporarily record associations between user IDs and MAC addresses, and/or user IDs and switch ports. In an embodiment, client database 215 may record current associations between user IDs and MAC addresses, and/or user IDs and switch ports. When the user changes devices the association between the user ID and the MAC address stored in client database 215 may be changed. When the user switches locations, the association between the user ID and the switch port stored in client database 215 may be changed. In an embodiment, these associations stored in client database 215 may be included in an IP lease record when an IP lease is granted. Client database 215 also may include an indication as to the user ID that should be associated with a particular user when an IP lease is granted. However, in an embodiment, the client database only temporarily stores the user ID. In alternative embodiments, client database 215 may be stored elsewhere, such as within user management system 108.

Relay 224 is the same as relay 124 except relay 224 handles option 82 information. For example, if the dynamic address assignment server 214 is a DHCP server, switch port information for network element 120 may be obtained and stored as option 82 information. In an embodiment, dynamic address assignment server 214 may, correlate switch port information with MAC addresses and/or IP addresses and store the correlation in IP lease records. The IP lease data may contain option 82 data as well, such as a switch port value, if the relay agent supports option 82.

In one operational approach, when one of network appliances 122a, 122b, ... 122n of a user requests and is granted an IP lease, if the user ID is recorded at network element 120, or if the user ID is provided to network element 120 by AAA server 118, then, in an embodiment, the user ID of the requesting user is communicated from relay 224 to dynamic network address assignment server 214. The user ID is stored in the Network Element 120 and associated with the port the user is connected to during a layer 2 authentication.

For example, the relay 224 may communicate the user ID by storing it with option 82 information. Dynamic network address assignment server 214 stores the IP lease data with the user ID in lease database 112. In an embodiment, by using option 82, relay 224 is able to include additional information about itself or about network element 120 when forwarding packets from one of network appliances 122a, 122b, ... 122n to the dynamic network address assignment server 214. For example, relay 224 can place a switch port value corresponding to a switch port used by the requesting user in the option 82 information. option 82 may be used by relay 224 as a means to provide additional information for allocating IP addresses to network appliances 122a, 122b, ... 122n.

Summarizing the manner in which the components of FIGS. 1 and 2 interact, when a user wants to use network 100 or 200, if the user has an account, the user logs in, via one of network appliances 122a, 122b, ... 122n, through network element 120. The login information includes a user ID. Optionally, network element 120 passes the login information to AAA server 118 for authentication. For example, optionally, AAA server 118 verifies that the user ID provided exists and that the password given is valid. If AAA server 118 is able to authenticate the user ID, dynamic network address assignment server 114 or 214 selects and assigns an IP address to the user. User management system 108 may check accounts 110 to see if the user is entitled to the services requested. Dynamic address assignment server 114 or 214 grants a lease for the IP address to the user via network element 120, and saves a lease record in lease database 112 or 212 including information related to the IP lease in association with the user ID.

Thus, optionally, the AAA server 118 server may authenticate the user. The data from the authentication may then be used to retrieve and store the user ID in the IP lease.

3.2 A Correlated Lease Record

FIG. 3 is a block diagram of an example of a correlated lease record 300. Lease record 300 includes a MAC address 302, additional data 303, an IP address 304, a time value 306, and a user ID 308. In alternative embodiment, lease record 300 may not have all of the components listed above or may have other components instead of or in addition to those listed above. For example, user ID 308 may be replaced with information about where and/or how to find the user ID, such as a reference to another table or database.

In one embodiment, record 300 is a record stored in lease database 112 or 212 having the user ID and lease information correlated. MAC address 302 is the MAC address of the network appliance of a user. MAC address 302 is associated with a device, such as one of the network appliances 122a, 122b, ... 122n. However, at different times different users may use the same MAC address. For example, two users may use the same computer. Therefore, although at a given point in time the MAC address 302 may uniquely and correctly identify the user, at another point in time the MAC address 302 may not correctly identify the user.

Additional data 303 may include a variety of other types of data, such as option 82 information and/or the switch port address.

IP address 304 is the IP address leased by the user. Time value 306 is the time identifying the lease of IP address 304. Time value 306 may be the time and date that the lease began or starts and ends.

User ID 308 is an identifier that uniquely identifies a user within a domain. In one approach, no two users of the same domain are assigned the same user ID 308. The domain may include services and network access provided by a single provider. Alternatively, the domain may include services and/or network access provided by all service providers that the user is capable of accessing. In an embodiment, the domain is an entire Wide Area Network (WAN), such as the Internet. In an embodiment, user ID 308 may be globally unique. In an embodiment, user ID 308 is a GUID. In an alternative embodiment, user ID 308 may be replaced with information about where and/or how to find the user ID, such as a reference to another table or database.

Special measures may be taken to disambiguate user ID 308 for two users of different service providers, when the service providers interoperate with the same dynamic network address assignment server 114 or 214 and assign network addresses from private network address pools that have the same range of network addresses. In an embodiment, two users of different providers that access the same dynamic network address assignment server 114 or 214 are uniquely identified by including a provider ID as part of user ID 308.

For example, assume that two users respectively subscribe to first and second different service providers. The users occupy the same hotel room, but at different times. The hotel may use a third network service provider as its ISP. Each of the first and second network service providers uses a different DHCP server to assign dynamic IP addresses, but the addresses are assigned from the same range. The user ID of the users may only be unique within their respective domains and/or may not be meaningful outside of their respective domains. If one would like to obtain user information for one of the two users, it is useful to know which network service provider to consult. In this context, an identification of a network service provider ID along with the User ID may be necessary to determine which OSS/BSS system to query in order to associate a given user ID with the corresponding user specific information, because each network service provider and associated set of OSS/BSS systems is a separate "domain". By including a network service provider identifier as an element of user ID 308, either the first or second network service provider may be identified as the network service provider where information associated with the user ID of the first or second user, respectively, could be found.

Similarly, in an embodiment, one network service provider may provide equal access to another network service provider so that a user may use the services of one user management system via another user management system associated with another network. In this embodiment, user ID 308 may also include a network service provider ID and a user ID, so that user ID 308 is sufficiently unique so that each user may be identified despite using the services of another network's user management system.

User ID 308 may be any size. In an embodiment, user ID 308 uses 64 bytes of storage. In another embodiment, user ID 308 may include several hundred bytes or more. In an embodiment, user ID 308 must be long enough so that user ID 308 can be globally unique or unique within a given domain during the life cycle of user ID 308.

3.3 Methods for Correlating the IP Lease Data

Figure 4:
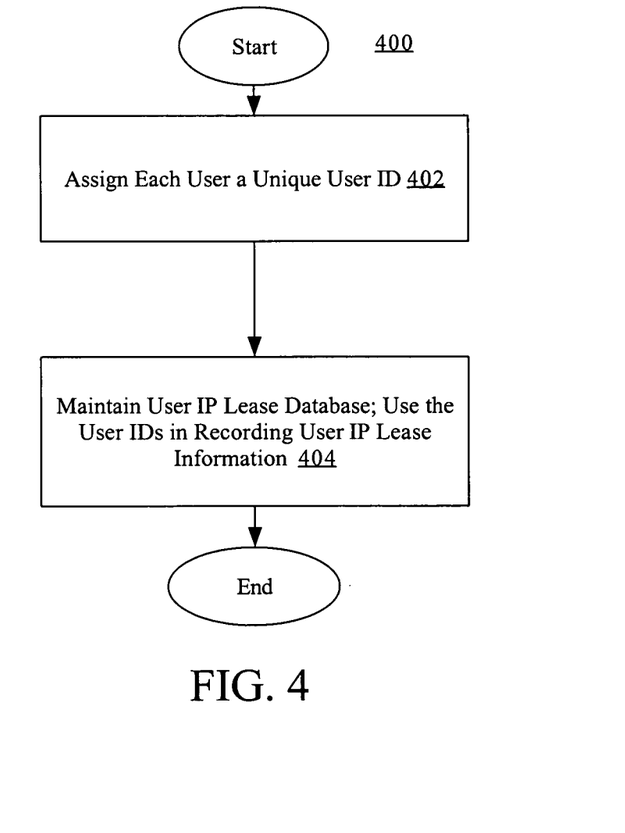
FIG. 4 is a flowchart of an embodiment of a method for correlating IP leases.

FIG. 4 is a flowchart of an embodiment of a method 400 for correlating IP leases. In step 402, each user of network 100 is assigned a user ID. In an embodiment, the user ID assigned to a user is an invariant association, and never changes. Also, in this embodiment, the same user ID is never assigned to multiple users. Thus, the user ID is unique within a particular administrative domain; in an alternative approach, the assigned user ID is globally unique.

User management systems, such as Cisco SMC Subscriber Edge Services Manager (SESM) or UMS 108, can assign this user ID when the user first registers with the system. Other systems may use other domain specific means for assigning a user ID to a network user.

To associate the user ID with the user, a database (e.g., user database 109) may be maintained and associates the user ID with other user information. OSS/BSS systems only need to maintain the user ID to user association established in step 402. User Management Systems (e.g., UMS 108) and OSS/BSS systems no longer need to maintain network specific details, such as MAC addresses or switch ports, for each user. Hence, User Management Systems and OSS/BSS may only contain their domain specific business logic without adding network specific details in the respective applications.

In step 404, dynamic network address assignment server 114 or 214 maintains lease database 112 or 214, and uses the user IDs in recording user IP lease information. The IP lease information may contain records, such as lease record 300. In alternative embodiment, method 400 may not have all of the steps listed above or may have other steps instead of or in addition to those listed above.

Figure 5:
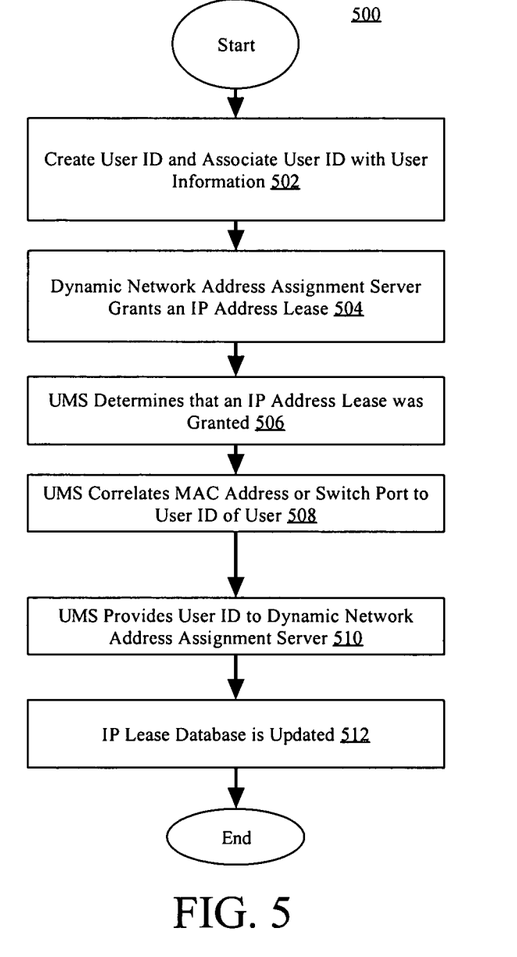
FIG. 5 is a flowchart of a method for correlating IP lease information with users, which is an example of the method of FIG. 4.

FIG. 5 is a flowchart of a method 500 for correlating IP lease information with users. Method 500 is an example of method 400. As an example, provisioning system 202 may be Cisco Broadband Access Center-Ethernet To The Home (BAC-ETTH), which supports user provisioning for users that are connected to switches that support option 82 as well as those that do not support option 82.

In cases where option 82 is not supported by the switch, the IP lease contains only the MAC address of the machine used by the user. User management system 108 correlates the MAC address to a registered user via application specific business logic. As an example of such application-specific business logic, the following steps may be performed:

In step 502, a globally unique user ID is created and associated with user information. The user ID may be created at user management system 108. In an embodiment, during the user's initial registration, user management system 108 queries inventory 116, which correlates postal addresses to an associated switch port. During the initial registration the MAC address used by the user may also be stored in the user record, which may be stored in user database 109, which is associated with user management system 108. It is not necessary to store the MAC address with the user ID for switches that support option 82, because option 82 provides other means of deriving the MAC address/user ID correlation.

Upon login and/or registration of the user, user management system 108 determines the switch port to which the user is connected. The switch port that the user is connected to may be used for service provisioning.

Next, in step 504, a dynamic network address assignment server grants an IP address lease to the user.

In response, in step 506, user management system 108 determines that the IP lease was granted, which may be performed by any of several mechanisms. In one mechanism, the dynamic network assignment server 114 or 214 generates or publishes an event every time a new IP lease is issued, which may be referred to as a lease granting events. The user management system 108 listens for or subscribes to lease granting events.

In step 508, user management system 108 correlates the MAC address or switch port to a user ID. For example, in an embodiment that includes option 82, the switch port value, as identified by option 82, is correlated to the user ID. If the switch supports option 82, the correlation of the switch port to the user ID may be received via option 82.

In another embodiment, the MAC address is correlated to the user ID. The correlation of the user ID and the MAC address may be performed via a search of user database 109 (in which the MAC address was stored during the registration or login process). The MAC address may be stored in user database 109 during the registration process, as discussed in step 502. Steps 502, 504, 506, and 508 are examples of sub-steps of step 402.

In step 510, user management system 108 provides the user ID to the dynamic network address assignment server 114 or 214. In step 512, lease database 112 or 212 is updated. For example, user management system 108 updates the IP lease record (e.g. IP lease record 300) and adds the user ID to the IP lease record. In other words, in this embodiment, anytime after the IP address lease has been granted to the user, lease database 112 or 212 is updated with the user ID provided to dynamic network assignment server 114 or 214 from user database 109 by user management system 108. As a result, the lease record contains a complete association of user identifying information to network address lease information, and the user ID of the user is available in user database 109. The user ID may be determined at a variety of points in method 500 in addition to step 502. Steps 510 and 512 are example of sub-steps that may be included in step 404.

Once the user ID is stored in the lease database 112 or 212, subsequent association of an IP lease (or IP lease history) to a user (whether active and unregistered) remains the same regardless of the network topology in use. The association process remains the same regardless of the underlying network topology and elements (whether or not the switches support option 82, for example).

Although in the above embodiment, the IP lease record is updated after the IP lease is granted, the IP lease record could also be updated at the time of the granting of the IP lease. For example, the user ID may be available in the lease request. The dynamic network address assignment server 214 creates the IP lease record with the user ID along with other information mentioned above. For instance, AAA server 118 may have sent the user ID to network element 120 after a successful user authentication. Relay Agent (e.g., relay 224) may add the user ID as options to the DHCP request. Also, the dynamic network assignment server may periodically archive the IP lease database.

3.4 A Method for Querying the Lease Information

Figure 6:
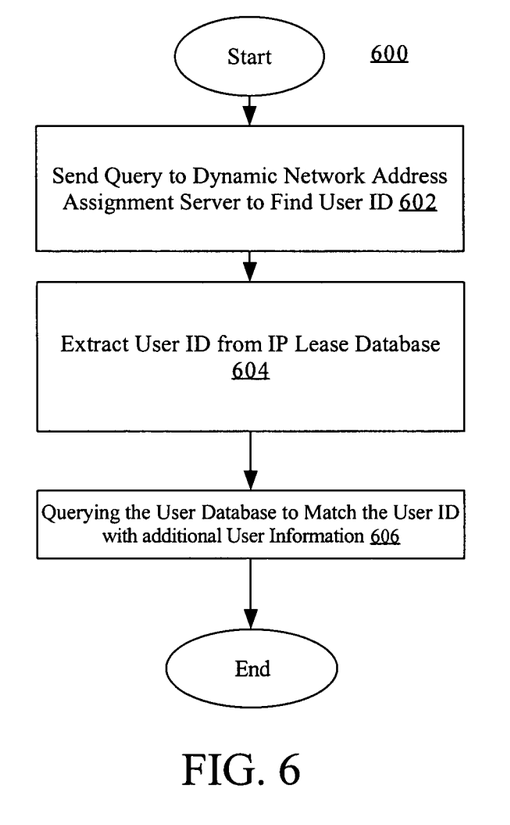
FIG. 6 is flowchart of an embodiment of a method for querying IP lease information, which is an example of the method of FIG. 4.

FIG. 6 is flowchart of a method 600 for querying IP lease information. Several mechanisms can be used to determine the dynamic network address assignment server 114 or 214 associated with an IP lease once the correlated IP lease information is stored in lease database 112 or 214, respectively. The mechanisms may be applied to both mobile and nonmobile users. In the embodiment of method 600 an IP lease query can be performed by the following steps:

In step 602, a query is sent to a dynamic network address assignment server to find a user ID. The query requests the user ID that leased a particular IP address at a particular time, for example. In one embodiment, the query of step 602 is received by dynamic network address assignment server 114 or 214 for further processing in the next step.

In step 604, a user ID is extracted from an IP lease database, such as lease database 112 or 212. For example, dynamic network address assignment server 114 or 214 uses the information from the query to search lease database 112 or 212 to find the user ID of interest. IP address 304 and time value 306 may be searched for in the IP address field and time field as keys to determine user ID 308, and user ID 308 is extracted from the lease record 300. In searching lease database 112 or 212 both active and archived lease data may be searched.

In step 606, the user ID is matched with additional information. Using user ID 308, an appropriate user database (e.g., user database 109) is queried to retrieve the user records associated with user ID 308. Active and archived user information in database 109 and/or accounts 110 may be searched. In an embodiment, user management system 108 queries user database 109, using user ID 308, to match the additional user information with user ID 308.

Method 600 is efficient and not as likely to result in a situation where there is not enough information to conclusively determine user ID 308. In an embodiment, since the lease correlation information is maintained by the dynamic network address assignment server 114 or 214, the processing burdens on applications are reduced compared with were the applications to correlate the lease correlation information. Similarly, in this embodiment, the applications do not need to analyze network specific details to determine the lease correlation information. In an embodiment, the same query process is used regardless of the network topology or the capabilities of the various network elements. In alternative embodiment, method 600 may not have all of the steps listed above or may have other steps instead of or in addition to those listed above.

3.5 Examples

There are a number of alternatives for adding the user ID into the lease data and lease history (e.g., in lease database 212) of dynamic network address assignment server 214. For example, in one approach in which dynamic network address assignment server 214 has a client database 215 that may be updated to include the user D. Client database 215 may be used as a source of user information, such as the user ID, with which to update lease database 212. In this embodiment, dynamic network address assignment server 214 may reference client database 215 when interacting with the client (e.g., one of network appliances 122*a*, 122*b*, . . . 122*n*) and in order to create the IP lease. Client database 215 may be searched by querying client database 215, using the MAC address, switch port, or user name, for example, as a primary key. Dynamic network address assignment server 214 records the user ID in the lease database 212 in a manner that the user ID is associated with the client's IP lease.

In another example, AAA server 118 communicates with an authenticator (e.g. a 802.1x authenticator) that is integrated within relay 224. Relay 224 discovers the user ID during the authentication process performed by AAA server 118. Alternatively, the user ID may be recorded on the switch port interface through which the user connects to network 200, and relay 224 may obtain the user ID from the switch port. For example, network device 120 may be a switch, and relay 224 may be a relay agent embedded in the switch. The switch may obtain the user ID from the switch port and add it to option 82. Relay 224 may explicitly add the user ID with other user information such as to option 82, or may add enough other user information that the user ID may be derived.

In another embodiment, client database 215 may be an external client database, such as an LDAP that contains the user ID. The external client database (client database 215) is referenced by dynamic network address assignment server 214 or by an extension (e.g., a plug-in) to the dynamic network address assignment server 214. The extension queries client database 215 during the lease granting process, and supplies the user ID to the dynamic network address assignment server 214 for storage with the IP lease in lease database 212.

4.0 IMPLEMENTATION MECHANISMS—HARDWARE OVERVIEW

Figure 7:
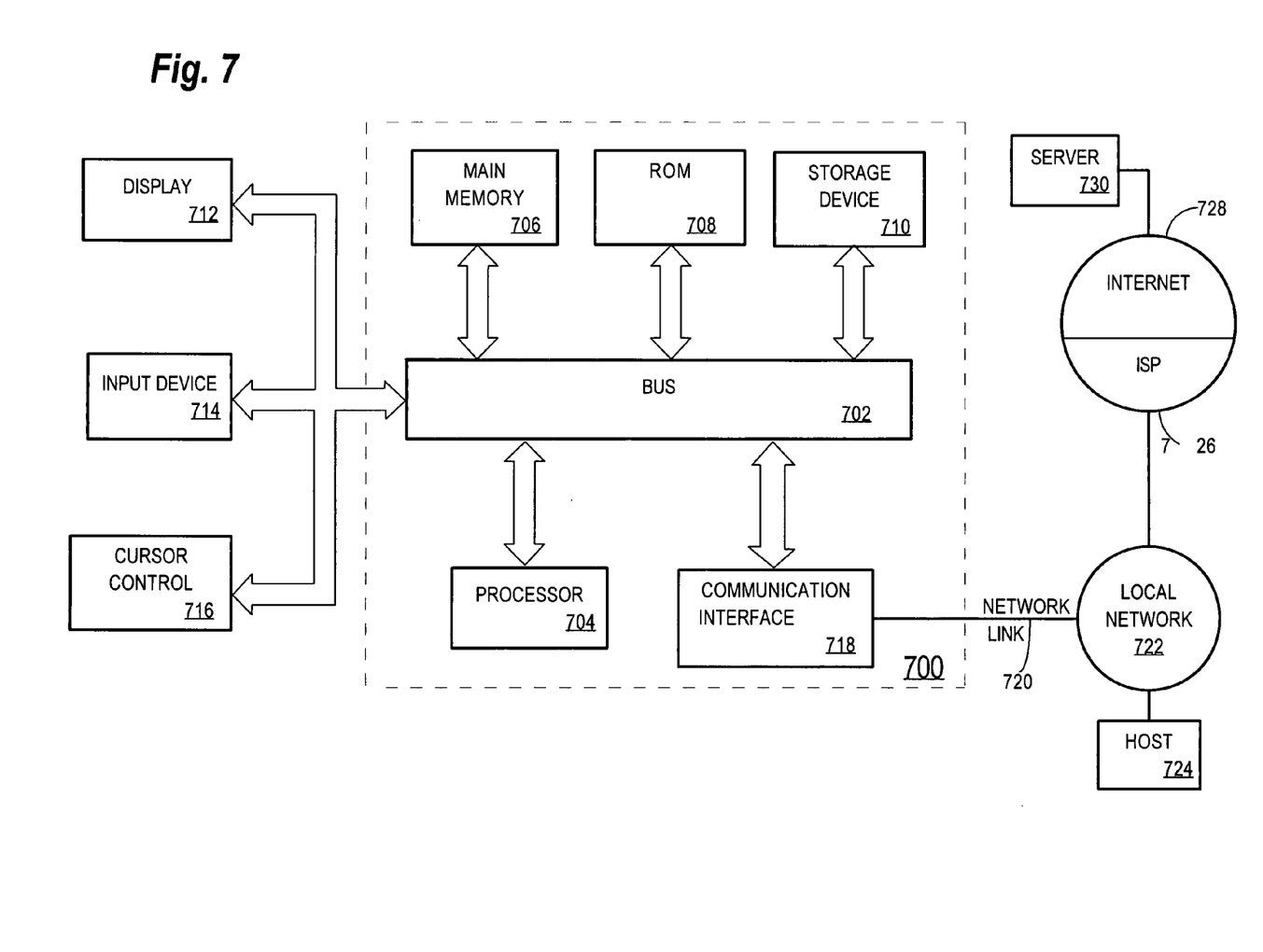
FIG. 7 is a block diagram that illustrates a computer system upon which an embodiment may be implemented.

FIG. 7 is a block diagram that illustrates a computer system 700, which is one embodiment of a machine upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for any part of or all of network 100 or network 200. According to one embodiment of the invention, associating network address lease information with user data or any other method described in this specification may be implemented by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution and is just one example of a "machine-readable medium". Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions (such as those of methods 400, 500, 600 and/or any other method disclosed herein) received by main memory 706 may optionally be stored on storage device 710 either before or after execution by processor 704. Methods 400, 500, 600 and/or any other method disclosed herein may also be temporarily or permanently stored on any computer readable medium of computer system 700 or any other computer readable medium.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code (e.g., methods 400, 500, 600 and/or any other method disclosed in this application), through the network(s), network link 720 and communication interface 718. In the Internet example, a server 730 might transmit a requested code for an application program through Internet 728, ISP 726, local network 722 and communication interface 718. In accordance with the invention, one such downloaded application provides for method 400, 500, 600, or any method of validating security described herein.

The received code may be executed by processor 704 as it is received, and/or stored in storage device 710, or other non-volatile storage for later execution. In this manner, computer system 700 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method of tracking an identity associated with a network address lease comprising: receiving a unique identification for a user of a network device that is configured to allow the user to currently access a network; wherein the identification is assigned to the user based on login information of the user; and in response to determining that the network address lease is granted to the network device, storing in a lease record the identification in association with network address lease information associated with the user; wherein the lease record includes the network address lease information, the identification, and a machine identifier of the network device; wherein the network address lease information includes a network address that is currently leased, in the network address lease, to the network device that is configured to allow the user to currently access the network.

2. A method as in claim 1, wherein the identification is unique within a domain that the user is capable of accessing.

3. A method as in claim 1, wherein the identification never changes.

4. A method as in claim 1, wherein the machine identifier includes a Media Access Control (MAC) address of the network device.

5. A method as in claim 1, wherein the network address lease information includes at least a start time and an end time for a grant of the network address lease.

6. A method as in claim 1, wherein the network address lease information includes at least a switch port value associated with the identification.

7. A method as in claim 1, wherein the network address lease information includes at least DHCP option 82 information associated with the identification.

8. A method as in claim 1, further comprising:
upon an initial login assigning the identification to the user.

9. A method as in claim 1, further comprising:
determining a switch port through which the user is connected to the network.

10. A method as in claim 1, further comprising:
prior to the storing, granting use of the network address to the network device with which the user accesses the network.

11. A method as in claim 1, further comprising:
searching a database where the lease record was stored during the storing; and
retrieving the lease record from the database.

12. A method as in claim 1, further comprising:
a dynamic network address assignment server including in the network address lease information user information that is stored in a client database for storing current user information.

13. A computer-implemented method of tracking an identity of a network address lease comprising: associating a Globally Unique Identifier (GUID) with user information for a user; wherein the GUID is assigned to the user based on login information of the user; a User Management System (UMS) determining the GUID based on a Media Access Control (MAC) address or a switch port associated with the user while the user currently accesses a network; a dynamic network address assignment server granting use of a network address to a network device with which the user accesses the network; in response, the UMS determining that the use of the network address was granted; the UMS searching a user database using the MAC address or switch port to retrieve the GUID; communicating the GUID from the UMS to the dynamic network address assignment server; and the dynamic network address assignment server including at least the GUID and the network address in a network address lease record, and storing the network address lease record in a network address lease database.

14. A computer-implemented method of tracking an identity of a network address lease comprising: associating a Globally Unique Identifier (GUID) with user information for a user; wherein the GUID is assigned to the user based on login information of the user; communicating the GUID from a User Management Server (UMS) to a dynamic network address assignment server while the user currently accesses a network; the dynamic network address assignment server maintaining a client database for storing current associations between GUIDs and Media Access Control (MAC) addresses, or GUIDs and switch ports; the dynamic network address assignment server granting use of a network address to a network device with which the user accesses the network; and the dynamic network address assignment server including at least the GUID and the network address in a network address lease record, and storing the network address lease record in a network address lease database.

15. A computer system comprising a processor and a memory storing one or more sequences of instructions for tracking an identity of a network address lease, wherein the instructions executed by one or more processors, cause the one or more processors to perform: receiving a unique identification for a user of a network device that is configured to allow the user to currently access a network; wherein the identification is assigned to the user based on login information of the user; and in response to determining that the network address lease is granted to the network device, storing in a lease record the identification in association with network address lease information associated with the user; wherein the lease record includes the network address lease information, the identification, and a machine identifier of the network device; wherein the network address lease information includes a network address that is currently leased, in the network address lease, to the network device that is configured to allow the user to currently access the network.

16. A computer system as in claim 15, wherein the identification is unique within a domain that the user is capable of accessing.

17. A computer system as in claim 15, wherein the identification never changes.

18. A computer system as in claim 15, wherein the machine identifier includes a Media Access Control (MAC) address of the network device.

19. A computer system as in claim 15, wherein the network address lease information includes at least a start time and an end time for a grant of the network address lease.

20. A computer system as in claim 15, wherein the network address lease information includes at least a switch port value associated with the identification.

21. A computer system as in claim 15, wherein the network address lease information includes at least option 82 information associated with the identification.

22. A computer system as in claim 15, wherein the one or more sequences of instructions further comprise instructions which, wherein the instructions executed by the one or more processors cause the one or more processors to perform: upon an initial login assigning the identification to the user.

23. A computer system as in claim 15, wherein the one or more sequences of instructions further comprise instructions which, wherein the instructions executed by the one or more processors cause the one or more processors to perform: determining a switch port through which the user is connected to the network.

24. A computer system as in claim 15, wherein the one or more sequences of instructions further comprise instructions which, wherein the instructions executed by the one or more processors, cause the one or more processors to perform: prior to the storing, granting use of the network address to the network device with which the user accesses the network.

25. A computer system as in claim 15, wherein the one or more sequences of instructions further comprise instructions which, wherein the instructions executed by the one or more processors cause the one or more processors to perform: a dynamic network address assignment server including in the network address lease information user information that is stored in a client database for storing current user information.

26. A computer system as in claim 15, wherein the one or more sequences of instructions further comprise instructions which, wherein the instructions executed by the one or more processors, cause the one or more processors to perform: searching a database where the lease record was stored during the storing; and retrieving the lease record from the database.

27. A computer system as in claim 15, wherein the unique identification is a Globally Unique Identifier (GUID) and wherein the instructions executed by the one or more processors cause the one or more processors to perform: prior to the receiving, associating the GUID with user information for the user; after the receiving, a dynamic network address assignment server granting use of the network address to the network device; in response, a User Management Server (UMS) determining that the use of the network address was granted; and the UMS searching a user database using a Media Access Control (MAC) address or a switch port to retrieve the GUID; wherein the receiving includes at least communicating the GUID from the UMS to the dynamic network address assignment server; and wherein the storing is performed by at least the dynamic network address assignment server including at least the GUID and the network address in the lease record, and storing the lease record in a network address lease database.

28. A computer system as in claim 15, wherein the unique identification is a Globally Unique Identifier (QUID) and wherein the instructions executed by the one or more processors, cause the one or more processors to perform: prior to the receiving, associating the GUID with user information for the user; a User Management System (UMS) determining a Media Access Control (MAC) address or a switch port to which the user is connected; and after the receiving, a dynamic network address assignment server granting use of the network address to the network device; wherein the receiving includes at least communicating the GUID from the UMS to the dynamic network address assignment server; and wherein the storing is performed by at least the dynamic network address assignment server including at least the GUID and the network address in the lease record, and storing the lease record in a network address lease database.

29. An apparatus for tracking an identity associated with a network address lease, comprising: a processor; one or more stored sequences of instructions, wherein the instructions executed by the processor cause the processor to perform: receiving a unique identification for a user of a network: device that is configured to allow the user to currently access a network; wherein the identification is assigned to the user based on login information of the user; and in response to determining that the network address lease is granted to the network device, storing in a lease record the identification in association with network address lease information associated with the user; wherein the lease record includes the network address lease information, the identification, and a machine identifier of the network device; wherein the network address lease information includes a network address that is currently leased, in the network address lease, to the network device that is configured to allow the user to currently access the network.

30. An apparatus as in claim 29, wherein the identification is unique within a domain that the user is capable of accessing.

31. An apparatus as in claim 29, wherein the identification never changes.

32. An apparatus as in claim 29, wherein the machine identifier includes a Media Access Control (MAC) address of the network device.

33. An apparatus as in claim 29, wherein the network address lease information includes at least a start time and an end time for a grant of the network address lease.

34. An apparatus as in claim 29, wherein the network address lease information includes at least a switch port value associated with the identification.

35. An apparatus as in claim 29, wherein the network address lease information includes at least option 82 information associated with the identification.

36. An apparatus as in claim 29, wherein the instructions executed by the processor cause the processor to perform: upon an initial login assigning the identification to the user.

37. An apparatus as in claim 29, wherein the instructions executed by the processor cause the processor to perform: determining a switch port through which the user is connected to the network.

38. An apparatus as in claim 29, wherein the instructions executed by the processor cause the processor to perform: prior to the storing, granting use of the network address to the network device with which the user accesses the network.

39. An apparatus as in claim 29, wherein the instructions executed by the processor cause the processor to perform: a dynamic network address assignment server including in the network address lease information user information that is stored in a client database for storing current user information.

40. An apparatus as in claim 29, wherein the instructions executed by the processor, cause the processor to perform: searching a database where the lease record was stored during the storing; and retrieving the lease record from the database.

41. An apparatus as in claim 29, further comprising: a subscriber management system; a dynamic network address assignment server; and a network address lease database; wherein the identification is at least a Globally Unique Identifier (GUID), wherein the instructions executed by the processor cause the processor to perform: prior to the receiving, associating the GUID with user information for the user; the subscriber management system determining a Media Access Control (MAC) address or a switch port to which the user is connected; the dynamic network address assignment server granting use of the network address to the network device; in response, the subscriber management system determining that the use of the network address was granted; the subscriber management system searching a user database using the MAC address or the switch port to retrieve the GUID; wherein the receiving includes at least communicating the GUID from the subscriber management system to the dynamic network address assignment server; and wherein the storing is performed by at least the dynamic network address assignment server including at least the GUID and the network address in the lease record, and storing the lease record in the network address lease database.

42. An apparatus as in claim 29, further comprising: a User Management System (UMS); a client database; a dynamic network address assignment server; and a network address lease database; wherein the identification is at least a Globally Unique Identifier (GUID), and the one or more stored sequences of instructions further comprise instructions which, wherein the instructions executed by the processor, cause the processor to perform: prior to the receiving, associating the GUID with user information for the user; the dynamic network address assignment server granting use of the network address to the network device; wherein the receiving includes at least communicating the GUID from the UMS to the dynamic network address assignment server; and wherein the storing is performed by at least the dynamic network address assignment server including at least the user information that is stored in the client database, the GUID, and the network address in the lease record, and storing the lease record in the network address lease database.

43. A system comprising: first one or more processors; first memory storing first instructions, wherein the first instructions executed by the first one or more processors, cause the first one or more processors to determine and communicate a user ID for a user; wherein the user ID is assigned to the user based on login information of the user; second one or more processors; and second memory storing second instructions wherein the second instructions executed by the second one or more processors, cause the second one or more processors to: store in a lease record the user ID in association with network address lease information, wherein: the lease record includes the network address lease information, the identification, and a machine identifier of the network device; and the network address lease information includes a network address that is currently leased, in the network address lease, to the network device that is configured to allow the user to currently access the network; and access, in the lease record, the network address lease information and the user ID that is stored in association with the network address lease information.

44. A system as in claim 43, further comprising a database, wherein the second instructions that cause the second one or more processors to store the user ID in association with the network address lease information further comprise instructions which, wherein the instructions, executed by the second one or more processors, cause the second one or more processors to store in the database a data record that includes at least the user ID and the network address lease information.

45. A system as in claim 43, wherein the second instructions further comprise instructions which, wherein the instructions, executed by the second one or more processors, cause the second one or more processors to execute a server that leases network addresses and supports accessing the network address lease information and the user ID.

* * * * *